Sept. 23, 1941.   A. SCHNORR   2,256,851

LOCKING DEVICE FOR NUTS, BOLTS, AND SCREWS

Filed March 4, 1939

Patented Sept. 23, 1941

2,256,851

UNITED STATES PATENT OFFICE 2,256,851

LOCKING DEVICE FOR NUTS, BOLTS, AND SCREWS

Adolf Schnorr, Stuttgart-Botnang, Germany

Application March 4, 1939, Serial No. 259,856
In Germany March 22, 1938

1 Claim. (Cl. 151—35)

This invention relates to a locking device for nuts and bolts to prevent accidental loosening by shocking action caused by shocks and vibrations.

Hitherto serrated or spring washers with inwardly or outwardly directed teeth were used for this purpose. These teeth are bent at an angle of 90° at their free ends, so that they can bite into the two bearing surfaces and thus prevent accidental loosening. Another construction has continuous oblique or radially cut slots, one of whose edges is bent upwards and the other downwards so that both bite into the bearing surfaces.

All these known constructions are open to the objection that the force required for loosening, the so-called loosening moment, is considerably less than the force required for tightening, the so-called tightening moment. As a result the security against the dangerous working loose of the nuts and bolts is not always insured.

This objection is overcome in an effective manner by the device according to the present invention. It has the shape of a continuous spoked wheel, sufficient clearance between the spokes being provided. The spokes themselves are uniformly twisted so that their edges are set alternately upwards and downwards. They thus bite into the bearing surfaces when these are tightened and produce a greatly increased locking effect as compared with the known constructions, with the result that accidental loosening of the nuts and bolts is impossible, which could not be avoided by the known constructions.

Two embodiments of the invention are illustrated by way of example in the accompanying drawing in which.

Spokes c with gaps d between them are formed in a washer a having a central hole b. This washer operates in the following manner:

When the nut is tightened, the edges of the oblique spokes penetrate into the corresponding bearing surfaces.

If the nut intends to turn, that is to work loose by shaking vibrations, the penetrating edges of the spokes prevent such turning of the nut.

Figure 1:
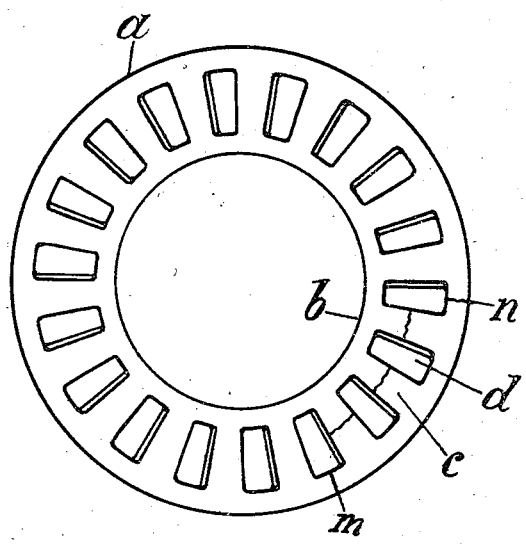
Fig. 1 shows the washer in plan view.
Figure 2:
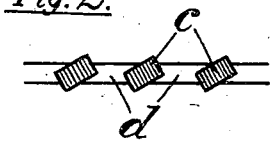
Fig. 2 is a section through twisted spoke edges along n—m of Fig. 1.
Figure 3:
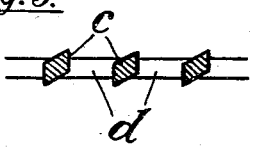
Fig. 3 shows a construction with spokes of a modified cross-section, in which the penetrating cutting edge is made sharper by re-stamping.

This form of construction presents the following advantages over the known constructions:

As the spokes are held at their inner and outer ends they cannot bend or break. The engaging edges act uniformly along their length on the entire bearing surface. They are made sharp edged by stamping out in opposite directions. Thus, a longer life is ensured for the washer so that the washer can be used not only once but repeatedly. In the form of construction illustrated in Fig. 3 the engaging edges are made much sharper by vertical re-stamping after the twisting of the spokes. Any chips which may be cut are reliably held in the gaps between the spokes. Thus, the screw threads are not damaged thereby. In the case of parts under current no short circuits can be caused by such chips.

The washers can be used not only for flat nuts and bolt heads but by corresponding conical shape they can also be used for countersunk screws, round headed screws and the like.

For jointly locking a row of bolts, the locking device may be constructed in the form of a band instead of as separate washers.

I claim:

In a resilient lock washer for nuts, wherein the washer comprising a disk has uninterrupted inner and outer edges, wherein a circular series of spaced radially directed apertures is formed between the inner and outer edges of the washer, and wherein the portions of the disk between the radial apertures are twisted to form teeth constituting locking pawls having work-engaging edges disposed in planes located outwardly of opposite sides of the disk, said disk portions between adjacent apertures being evenly twisted over substantially their entire radial length at the same angle and presenting work-engaging edges straight throughout their lengths, said twisted disk portions being of rectangular formation in cross-section and said radial slots and intervening disk portions being of a length equal at least to one-half the radial distance between the inner and outer edges of the disk.

ADOLF SCHNORR.